US007643747B2

(12) United States Patent
Cha

(10) Patent No.: US 7,643,747 B2
(45) Date of Patent: Jan. 5, 2010

(54) PHOTOGRAPHING APPARATUS AND INITIALIZATION METHOD THEREOF

(75) Inventor: Sang-hyuk Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 284 days.

(21) Appl. No.: 11/783,086

(22) Filed: Apr. 5, 2007

(65) Prior Publication Data
US 2008/0112702 A1 May 15, 2008

(30) Foreign Application Priority Data
Nov. 13, 2006 (KR) .................... 10-2006-0111716

(51) Int. Cl.
*G03B 7/26* (2006.01)
*G03B 17/00* (2006.01)
(52) U.S. Cl. ....................................... 396/280; 396/439
(58) Field of Classification Search ................. 396/439, 396/280
See application file for complete search history.

(56) References Cited

U.S. PATENT DOCUMENTS

| 6,195,511 | B1 * | 2/2001 | Harada ....................... 396/300 |
| 6,490,419 | B2 * | 12/2002 | Teramoto ...................... 396/321 |
| 7,046,924 | B2 * | 5/2006 | Miller et al. ................... 396/51 |
| 2005/0200722 | A1 * | 9/2005 | Ono .......................... 348/222.1 |
| 2006/0192859 | A1 * | 8/2006 | Sasaki ........................ 348/222.1 |
| 2006/0290804 | A1 * | 12/2006 | Mino et al. ................... 348/348 |
| 2007/0122006 | A1 * | 5/2007 | Taniguchi .................... 382/116 |

* cited by examiner

*Primary Examiner*—W. B. Perkey
*Assistant Examiner*—Dennis Hancock
(74) *Attorney, Agent, or Firm*—Roylance, Abrams, Berdo & Goodman, LLP

(57) ABSTRACT

A photographing apparatus requiring a short initialization time, and a method thereof are provided. The photographing apparatus includes a camera part for converting an optical image converged through a lens into an electric signal, and processing the electric signal into an image signal, a first memory for temporarily storing the image signal generated at the camera part, a second memory for storing the image signal stored in the first memory, and a signal processing part for temporarily storing the image signal to the first memory during initialization of the second memory, and upon completion of the initialization of the second memory, storing the image signal stored in the first memory to the second memory. As a result, initialization time of the photographing apparatus is shortened.

18 Claims, 3 Drawing Sheets

PHOTOGRAPHING APPARATUS AND INITIALIZATION METHOD THEREOF

CROSS-REFERENCE TO RELATED APPLICATION

This application claims the benefit under 35 U.S.C. §119 (a) of Korean Patent Application No. 2006-0111716, filed Nov. 13, 2006 in the Korean Intellectual Property Office, the entire disclosure of which is hereby incorporated by reference.

BACKGROUND OF THE INVENTION

1. Field of the Invention

The present invention relates to a photographing apparatus requiring a short initialization time, and a method thereof. More particularly, the present invention relates to a photographing apparatus requiring a short initialization time between power supply to the photographing apparatus and a starting of photographing, and a method thereof.

2. Description of the Related Art

Generally, a photographing apparatus such as a camcorder or a still camera operates to convert an optical signal received through a lens into an electric signal, and process the converted image signal. The photographing apparatus requires a series of stages from when power is input to the apparatus until the apparatus is ready for photographing. This will be explained briefly, with reference to FIG. 1.

FIG. 1 is a flowchart illustrating an initialization method of a conventional photographing apparatus.

When the photographing apparatus is turned on (S10), a Digital Signal Processor (DSP) receives the power supply, and a Random Access Memory (RAM) is initialized (S11). That is, the RAM is initialized as the DSP reads out addresses of the entire regions of the RAM one by one, and records the addresses as '0'.

As the DSP determines whether or not there is an interrupt, and sets roles of all the connected ports, the DSP is initialized (S12). The DSP then supplies power to the other components of the photographing apparatus. Accordingly, the components are initialized (S13). The DSP then adjusts the camera part, using the adjustment data stored in an Electrically Erasable and Programmable Read Only Memory (EEPROM) (S14).

The camera part operates to convert the optical image converged through the lens into an electric signal at a Charge Coupled Device (CCD), and process the converted signal using Auto Exposure (AE), Auto Focus (AF) and Auto White Balance (AWB). All the photographing apparatuses cannot be made perfect and identical to each other, during manufacture. That is, the photographing apparatuses generally have slight variations and these variations usually occur in the camera part. The adjustment data are thus provided to reduce such variations.

When the camera part is adjusted based on the adjustment data, the DSP re-adjusts the camera part to suit for the current photographing environment (S15). The DSP then initializes the card part, to which memory card or compact flash card is mounted (S16). In other words, the DSP reads out information from the card mounted to the card part.

Accordingly, the photographing apparatus stands by for the photographing (S17). If a user starts photographing (S18), the DSP stores the captured image signal to the card part (S19).

As explained above, it usually takes several seconds from the time that the power is supplied to the photographing apparatus until the time that the apparatus is available for photographing. Accordingly, the user is unable to take photographs instantly, but has to wait for a predetermined time period, which is quite inconvenient.

Accordingly, there is a need for a photographing apparatus and a method thereof, which requires a short initialization time between a power input to the apparatus until the apparatus is ready for photographing, such that a user can take photographs quickly.

SUMMARY OF THE INVENTION

Exemplary embodiments of the present invention address at least the above problems and/or disadvantages and provide at least the advantages described below. Accordingly, an aspect of exemplary embodiments of the present invention is to provide a photographing apparatus and a method thereof, which requires a short initialization time between a power input to the apparatus until the apparatus is ready for photographing, such that a user can take photographs quickly.

An exemplary aspect of the present invention provides a photographing apparatus, comprising a camera part for converting an optical image converged through a lens into an electric signal and processing the electric signal into an image signal, a first memory for temporarily storing the image signal generated at the camera part, a second memory for storing the image signal stored in the first memory, and a signal processing part for temporarily storing the image signal to the first memory during initialization of the second memory, and upon completion of the initialization of the second memory, storing the image signal stored in the first memory to the second memory.

The first memory may comprise a random access memory (RAM). The second memory may comprise one of a memory card and a compact Flash card, both of which may be detachable. Alternatively, the second memory may comprise at least one of a hard disk drive (HDD) and an optical recording medium.

A flash memory may be further provided, for storing adjustment data for removing variations of the camera parts, along with a program source. The signal processing part reads out the program source and the adjustment data from the flash memory and adjusts the camera part, upon turning on of the photographing apparatus.

The signal processing part may send an initialization command to the first memory only once, and adjust the camera part using the adjustment data while the first memory is initialized.

Another exemplary aspect of the present invention provides a method of initialization, comprising converting an optical image converged through a lens into an electric signal and processing the electric signal into an image signal, temporarily storing the image signal to the first memory, and upon completion of the initialization of the second memory, storing the image signal stored in the first memory to the second memory.

The first memory may comprise a random access memory (RAM). The second memory may comprise one of a memory card and a compact Flash card, both of which may be detachable. Alternatively, the second memory may comprise at least one of a hard disk drive (HDD) and an optical recording medium.

In one exemplary implementation, the method of initialization may further comprise reading out adjustment data along with a program source from a third memory, while initializing the first memory, and adjusting a camera part using the adjustment data.

The third memory may comprise a flash memory.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
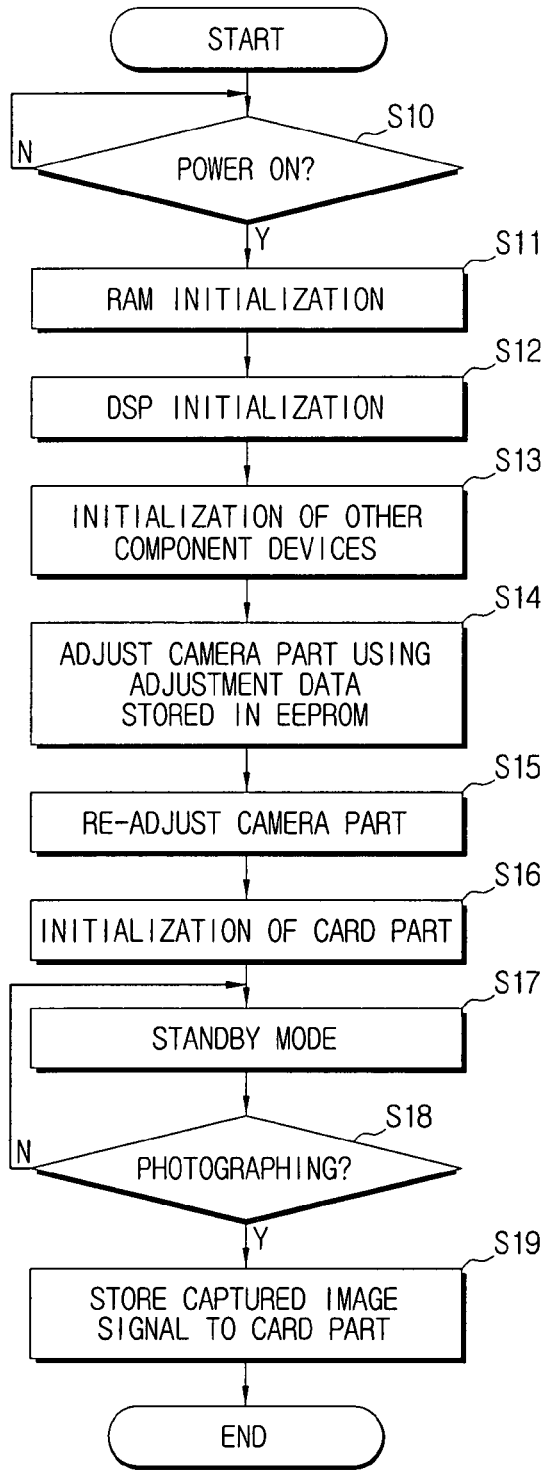
FIG. 1 is a flowchart illustrating a method of initialization in a conventional photographing apparatus.
Figure 2:
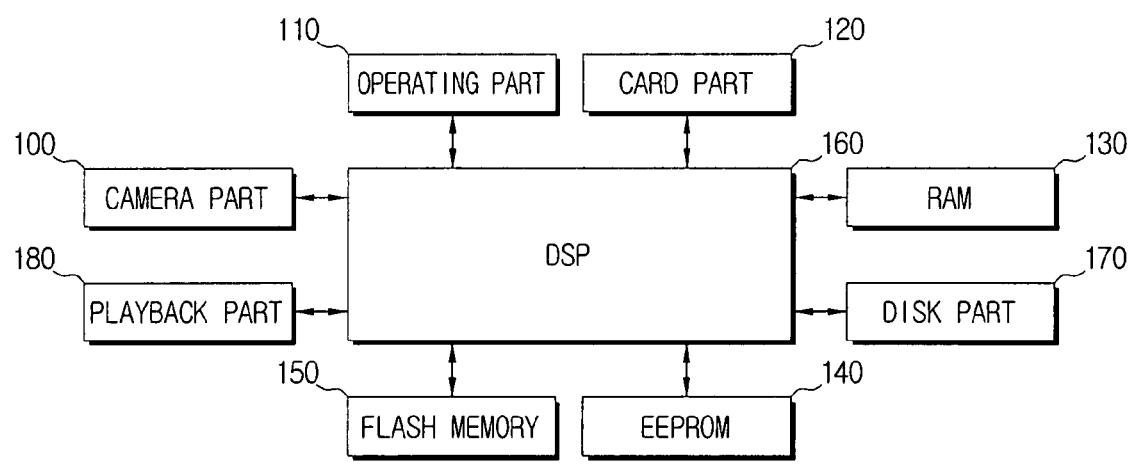
FIG. 2 is a block diagram of a photographing apparatus according to an exemplary embodiment of the present invention.

FIG. 2 is a block diagram of a photographing apparatus according to an exemplary embodiment of the present invention.

Referring to FIG. 2, the photographing apparatus according to an exemplary embodiment of the present invention may include a camera part 100, an operating part 110, a card part 120, a Random Access Memory (RAM) 130, an Electrically Erasable and Programmable Read Only Memory (EEPROM) 140, a Flash memory 150, a Digital Signal Processor (DSP) 160, a disk part 170 and a playback part 180.

The camera part 100 generates an image signal by converting the optical image converged through the lens (not shown) at a Charge Coupled Device (CCD) (not shown), and processing the electric signal according to Auto Exposure (AE), Auto Focus (AF) and Auto White Balance (AWB). Upon power input to the photographing apparatus, adjustments of the camera part 100, such as lens focus, zoom and white balance, are made according to adjustment data stored in the flash memory 150, which will be explained below. The camera part 100 is then re-adjusted to suit for the current photographing environment.

The operating part 110 may include a variety of keys for inputting user commands. Accordingly, user commands to control the operation of the photographing apparatus are input through the operating part 110, such that signals corresponding to the input commands are provided to the DSP 160, which will be explained below.

The card part 120 may mount a memory card and a compact Flash card to store captured image signals. The card part 120 is initialized as the DSP 160 reads out card information from the card mounted to the card part 120, and determining the capacity and structure of the card. After the initialization of the card part 120, the captured image signal is recorded on the card part 120.

The RAM 130 temporarily stores the data which is generated while the DSP 160 performs the operation of the photographing apparatus. The image signal being captured through the camera part 100 is temporarily stored in the RAM 130 and then stored in the card part 120. The RAM 130 preferably has a capacity up to 64M, and stores image signals corresponding to approximately 1 to 3 sheets of photos.

Unlike the conventional system of reading out one address from the DSP 160 at a time and recording the address as '0' data, the RAM 130 according to the exemplary embodiment of the present invention records the entire regions of the RAM 130 as '0' data, according to a batch initialization command being received from the DSP 160. Depending on program source executed by the DSP 160, certain addresses of the RAM 130 store predetermined values upon starting of the program.

The EEPROM 140 stores user set information, and once stored, the information of the EEPROM 140 is not deleted even by turning off the photographing apparatus. The user set information may be varied according to user manipulation, and includes photo size, photographing mode and photographing environments.

The Flash memory 150 stores a program source to execute the operation of the photographing apparatus, and adjustment data to remove variations of the camera part 100, both at the same region. When the photographing apparatus is turned on, the adjustment data and the program source are read out, and used by the DSP 160 to make adjustments such as lens focus, zoom and white balance.

The DSP 160, upon receipt of power-on command through the operating part 110, provides the RAM 130 with the batch initialization command, and adjusts the camera part 100, using the adjustment data which is stored in the Flash memory 150 during the initialization of the RAM 130. Depending on the photographing environment, the DSP 160 may initialize the card part 120 during re-adjustment of the camera part 100, by reading out card information from the card mounted to the card part 120.

Upon receipt of photographing command through the operating part 110, the DSP 160 temporarily stores the captured image signal to the RAM 130, and upon completion of the initialization of the card part 120, stores the image signal of the RAM 130 onto the card part 120. The DSP 160 stores the image signal, which is captured after the completion of the initialization of the card part 120, onto the card part 120.

The disk part 170 may include an optical recording medium such as a Hard Disk Drive (HDD), and a Digital Versatile Disk (DVD), and the image signal temporarily stored in the RAM 130 may be stored onto the disk part 170 according to a user command.

The playback part 180 may include a display panel such as a Liquid Crystal Display (LCD), and image signals generated at the camera part 100, or image signals stored in the card part 120 and the disk part 170, are played back in the form of an image on the display panel.

Figure 3:
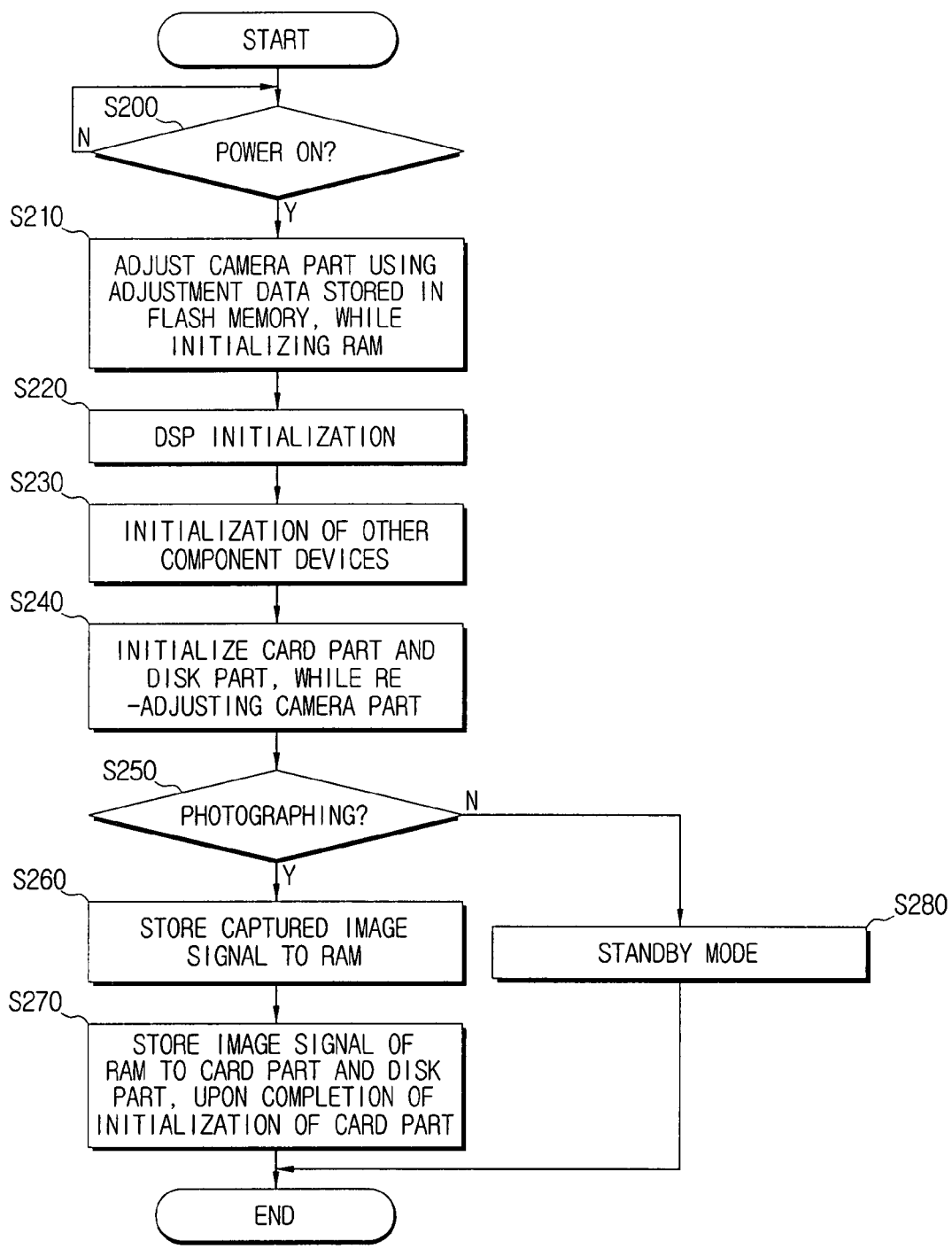
FIG. 3 is a flowchart illustrating a method of initialization in a photographing apparatus according to an exemplary embodiment of the present invention.

FIG. 3 is a flowchart provided to explain a method of initialization of a photographing apparatus according to an exemplary embodiment of the present invention.

Referring to FIG. 3, as the photographing apparatus is turned on (S200), the DSP 160 initializes the RAM 130, and adjusts the camera part 100, using the adjustment data stored in the Flash memory 150 (S210). More specifically, in response to a power-on command input through the operating part 110, the DSP 160 reads out program source and adjustment data stored in the Flash memory 150, and executes the program source. The DSP 160 then provides the RAM 130 with a batch initialization command, and conducts adjustments such as lens focus, zoom and white balance of the camera part 100, using the adjustment data read out from the Flash memory 150, while the RAM 130 is being initialized.

The DSP 160 then determines whether an interrupt has occurred due to external manipulation, and sets the roles of all the connected ports of the DSP 160 according to the program source. As a result, the DSP 160 is initialized (S220).

Upon initialization of the DSP 160, the other components such as the camera part 100 and the playback part (not shown) receive power and start initialization (S230), and the DSP 160 re-adjusts the camera part 100 and initializes the card part 120 and the disk part 170. That is, the DSP 160 conducts adjustments such as lens focus, zoom and white balance of the camera part 100 to suit for the current photographing environment, and also reads out card information from the card at the card part 120 to determine capacity and structure of the card. The DSP 160 also initializes the HDD and DVD of the disk part 170 (S240).

When the photographing begins (S250), the DSP 160 temporarily stores the captured image signal to the RAM 130 (S260), and upon completion of the initialization of the card part 120, stores the image signal of the RAM 130 onto the card part 120 or the disk part 170 (S270). The DSP 160 temporarily stores the captured image to the RAM 130, rather than waiting until the initialization of the card part 120 and the disk part 170 finishes to store the captured image signal to the card part 120 or the disk part 170. As a result, the initialization time of the photographing apparatus is shortened.

If the photographing does not begin at operation S250, the photographing apparatus stands by for photographing (S280).

As explained above, because the adjustment data is stored to the Flash memory 150 together with the program source, the adjustment data is read out by the DSP 160 upon turning on of the photographing apparatus, together with the program source. Therefore, the initialization time of the photographing apparatus is shortened. While it generally takes approximately 1s of time to read out the adjustment data from the EEPROM 140, it generally takes approximately 1 ms of time read out the adjustment data from the Flash memory 150.

Furthermore, the DSP 160 can simply provide a batch initialization command to the RAM 130 to start the initialization of the RAM 130, and attend to other commands while the RAM 130 is initialized. Therefore, initialization time is shortened. Furthermore, because the captured image signal is not stored in the card part 120 or the disk part 170, but temporarily stored to the RAM 130 while the card part 120 and the disk part 170 are initialized, the interval between the turning on of the photographing apparatus and the actual photographing is shortened.

As explained above, initialization time of the photographing apparatus is shortened, and the user can take photographs instantly as he wants. As a result, user convenience is provided.

The present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While certain exemplary embodiments of the present invention have been shown and described with reference to certain preferred embodiments thereof, it will be understood by those skilled in the art that various changes in the form and details may be made therein without departing from the spirit and scope of the invention as defined by the appended claims and their equivalents.

What is claimed is:

1. A photographing apparatus, comprising:
   a camera part for converting an optical image converged through a lens into an electric signal, and processing the electric signal into an image signal;
   a first memory for temporarily storing the image signal generated by the camera part;
   a second memory for storing the image signal stored in the first memory; and
   a signal processing part for temporarily storing the image signal in the first memory during initialization of the second memory, and upon completion of the initialization of the second memory, storing the image signal stored in the first memory to the second memory.

2. The photographing apparatus of claim 1, wherein the first memory comprises a random access memory (RAM).

3. The photographing apparatus of claim 1, wherein the second memory comprises one of a detachable memory card and a detachable compact Flash card.

4. The photographing apparatus of claim 1, wherein the second memory comprises at least one of a hard disk drive (HDD) and an optical recording medium.

5. The photographing apparatus of claim 1, further comprising a flash memory for storing adjustment data for removing variations of the camera parts, along with a program source, and wherein,
   the signal processing part reads out the program source and the adjustment data from the flash memory and adjusts the camera part, upon turning on of the photographing apparatus.

6. The photographing apparatus of claim 1, wherein the signal processing part provides an initialization command to the first memory only once, and adjusts the camera part using the adjustment data while the first memory is initialized.

7. A method of initialization, comprising:
   converting an optical image converged through a lens into an electric signal, and processing the electric signal into an image signal;
   temporarily storing the image signal to a first memory; and
   upon completion of initialization of a second memory, storing the image signal stored in the first memory to the second memory.

8. The method of claim 7, wherein the first memory comprises a random access memory (RAM).

9. The method of claim 7, wherein the second memory comprises one of a detachable memory card and a detachable compact Flash card.

10. The method of claim 7, wherein the second memory comprises at least one of a hard disk drive (HDD) and an optical recording medium.

11. The method of claim 7, further comprising:
 reading out adjustment data along with a program source from a third memory, while initializing the first memory; and
 adjusting a camera part using the adjustment data.

12. The method of claim 11, wherein the third memory comprises a flash memory.

13. A computer readable medium of instructions for controlling a camera part and a processor to initialize a photographing apparatus, comprising:
 a first set of instructions for controlling the camera part to convert an optical image converged through a lens into an electric signal, and to process the electric signal into an image signal;
 a second set of instructions for controlling the processor to temporarily store the image signal to a first memory, and, upon completion of the initialization of a second memory, to store the image signal stored in the first memory to the second memory.

14. The computer readable medium of instructions of claim 13, wherein the first memory comprises a random access memory (RAM).

15. The computer readable medium of instructions of claim 13, wherein the second memory comprises one of a detachable memory card and a detachable compact Flash card.

16. The computer readable medium of instructions of claim 13, wherein the second memory comprises at least one of a hard disk drive (HDD) and an optical recording medium.

17. The computer readable medium of instructions of claim 13, further comprising:
 a third set of instructions for controlling the processor to read out adjustment data along with a program source from a third memory, while initializing the first memory, and to adjust the camera part using the adjustment data.

18. The computer readable medium of instructions of claim 17, wherein the third memory comprises a flash memory.

* * * * *